3,096,317
METHOD FOR PURIFYING POLYOLEFINS BY FILTRATION UNDER A PARTIAL PRESSURE OF DISSOLVED GAS
David C. Hull, Hugh J. Hagemeyer, Jr., and John W. Wilder, Longview, Tex., assignors to Eastman Kodak Company, Rochester, N.Y., a corporation of New Jersey
No Drawing. Filed Jan. 11, 1960, Ser. No. 1,414
8 Claims. (Cl. 260—93.7)

This invention relates to a novel process for the removal of impurities from solid high molecular weight macromolecular materials. In a specific aspect, this invention relates to a novel and efficient process for the removal of impurities from solid high molecular weight polyhydrocarbons. In a more specific aspect, this invention relates to a novel and efficient process for the removal of insoluble catalyst particles from solid polyhydrocarbons, such as polyethylene and polypropylene.

It has long been recognized that in order to realize the greatest advantages from most solid high molecular weight macromolecular materials, it is necessary to have these materials in a substantially pure form, and various procedures have been devised for removing undesirable impurities from these substances. For example, when polymers, such as polyesters and polyacrylonitriles, are prepared, it is usually considered desirable to remove catalyst particles and other impurities from the polymer, and this impurity removal step is particularly desirable when the polymers are employed to form synthetic fibers. One method of removing impurities involves filtration of the polymer dope prior to formation of the fiber in order to prevent plugging of spinnerettes.

With solid high molecular weight polyhydrocarbons, such as polyethylene and polypropylene, it has also been recognized that impurities such as catalyst particles should be removed from the polymer. One method of removal of catalyst particles from these polymers has involved a washing of the polymer with an aliphatic alcohol or other wash medium. This procedure is often impractical and disadvantageous. For example, it is usually necessary to prepare the polymer in a finely divided form so that the maximum amount of polymer surface can be exposed to the washing medium for efficient washing. However, in a finely divided form, polyethylene and polypropylene are susceptible to oxidation reactions which seriously affect the properties of the polymers. Purification by washing also has required the use of large volumes of wash liquids and a complicated wash liquid recovery system and, in addition, the washing process usually has produced a product possessing a relatively high ash residue. Another procedure for removing catalyst particles and other impurities from polyethylene and polypropylene has involved a filtration procedure. The fine particle size of the catalyst to be removed by filtration requires a dense filtration medium or paper of small pore size which leads to pressure drops across the filter so large as to make filtration impossible at normal solution viscosities. Also, it is known that polyethylene and polypropylene solutions tend to become quite viscous at relatively low concentrations making filtration quite difficult and in order to make the filtration procedures feasible and practical, it has been necessary in the prior art processes to filter solutions of such polymers having a relatively low concentration of the polymer, e.g., about 2 to 3% by weight. At such low concentrations, these procedures have been comparatively expensive and the handling and purification of the large volume of polymer solvent has been a rather cumbersome and expensive operation.

We have discovered that it is possible to remove catalyst particles and other insoluble impurities from high molecular weight macromolecular materials by an efficient and comparatively inexpensive process that has not been described in the art heretofore. Accordingly, it is an object of this invention to provide a novel purification process for high molecular weight macromolecular materials. It is another object of this invention to provide a novel and efficient process for the removal of catalyst and other insoluble impurities from high molecular weight solid polyhydrocarbons. It is a further object of this invention to provide a novel process for the removal of catalyst and other insoluble impurities from high molecular weight polyethylene and polypropylene using a filtration process wherein unusually high concentrations of liquified polymer can be filtered to obtain a polymer substantially free of catalyst or other insoluble impurities. Further and additional advantages of this invention will be quite readily apparent from the detailed description heretofore.

In accordance with this invention, we have found that solid catalyst particles and other insoluble impurities can be removed from high molecular weight macromolecular materials by filtering the macromolecular substance in a liquefied form at a temperature at which the catalyst particles or other insoluble impurities are in a solid form and under a sufficient partial pressure of a gas soluble in said liquefied macromolecular materials to reduce substantially the viscosity of said liquefied macromolecular materials. Our invention will be described in detail as a process for the purification of high molecular weight solid polyhydrocarbons, such as polyethylene, polypropylene and the like. However, it will be realized by those skilled in the art that this invention can also be applied to the purification of other liquefied high molecular weight macromolecular materials without departing from the scope of our invention.

For practicing our invention, the high molecular weight polyhydrocarbon or other macromolecular material is in a liquified form either in molten form or dissolved in a suitable solvent, and the liquefied polymer is filtered at an elevated temperature and under a partial pressure of dissolved gas. The temperature for practicing our invention is sufficient to maintain the polymer in solution or in a molten form and at the same time, the catalyst or other impurities remain insoluble. The partial pressure of soluble gas that is used in our process is sufficient to effect a substantial reduction in the viscosity of the polymer in molten form or in solution.

Our invention is particularly useful for the removal of insoluble catalyst particles from polymers of α-monoolefinic hydrocarbons produced in a low pressure process. In fact, the filtration process of our invention can be readily incorporated into a low pressure process for the polymerization of ethylene and propylene to solid high molecular weight polymer, and the resulting product is substantially free of any catalyst particles. Low pressure polymerization techniques for preparing polymers of α-monoolefinic hydrocarbons, such as ethylene and propylene, using insoluble inorganic or insoluble organic-inorganic complexes as catalysts are well known in the art. Typical catalyst systems for such polymerization reactions include unpromoted chromium oxide deposited on a silica-alumina carrier, molybdenum oxide on γ-alumina as a carrier and promoted with an alkali metal, such as sodium, and the inorganic and organic-inorganic complexes formed from a metal of the first to the third groups of the periodic table or the hydrides, alkyls and alkyl hydrides or halides of such metals with a compound of a metal in the fourth to the sixth groups of the periodic table. Such catalysts for the polymerization of ethylene and propylene are well known in the art, and typical examples of these catalysts are aluminum triethyl-titanium tetrachloride, lithium aluminum hydride-titanium trichloride, sodium amyl-titanium tetrachloride and the like. These catalysts are merely exemplary of the inorganic or organic-inorganic complexes that can be used in the polymerization reaction. The polymerization reactions are often conducted in an inert liquid solvent or diluent, such as an inert liquid hydrocarbon, or liquid monomer, and it is preferred that the polymer be soluble in the solvent or diluent. In order to realize the greatest benefits of our invention, the catalyst that is employed to polymerize the ethylene, propylene or other monomer is completely insoluble in any organic solvent or liquid monomer that is employed for the polymerization reaction. Unpromoted supported metal oxide catalysts that have been used in these polymerization reactions are ordinarily insoluble in the reaction medium. When an alkali metal-promoted metal oxide catalyst is employed for the polymerization reaction it is preferred to use no more alkali metal than that which is retained on the surface of the metal oxide catalyst as a high surface suspension. If additional quantities of the alkali metal are employed as a promoter excess alkali metal is usually present in the polymer solution or molten polymer and the excess alkali metal tends to produce undesirable discoloration and a high ash content in the polymer. When inorganic or organic-inorganic complexes are employed as the polymerization catalyst, it is desirable to mix and prereact the metal or metal compound of the first to the third groups of the periodic table with the compound of a metal from the fourth to the sixth groups of the periodic table and after the desired catalyst complex has been formed, unreacted catalyst components and any other impurities are removed by elutriation preferably with a hydrocarbon solvent similar to the solvents that are employed in the polymerization reaction.

The polymerization of the α-monoolefinic hydrocarbon can be carried out in a solution, slurry or solid polymerization process, and the resulting polymer can be readily employed in our purification procedure. In a solution polymerization process, our filtration step is usually carried out under a pressure of soluble gas at least equal to the partial pressure of α-monoolefinic hydrocarbon employed in the polymerization reaction. In the slurry and solid polymerization procedures, the polymeric product in slurry or solid form is usually heated either in the polymerization reactor or in another suitable vessel to a temperature high enough to form molten polymer or to dissolve the polymer in the solvent under the desired partial pressure of the α-monoolefinic hydrocarbon. The molten polymer or polymer solution containing dissolved α-monoolefinic hydrocarbon is then passed through our filtration operation.

The molten polymer or polymer solution that can be filtered in our process can have viscosities ranging up to a million poises. Our improved filtration process is based upon the discovery that the viscosity of the polymer solution or of the molten polymer can be reduced by a factor of at least 20 or more by filtering the polymer solution or molten polymer under a partial pressure of dissolved gas of 100 to 5000 p.s.i., preferably under a partial pressure of at least 1000 p.s.i. of the olefinic monomer. The following table shows the viscosity change in poises that takes place in a 20% by weight solution of polyethylene in odorless mineral spirits as a solvent at 250° C. when the partial pressure of ethylene in the solution is gradually increased from atmospheric pressure to 1000 p.s.i.g.

TABLE 1

*Viscosity Change of a 20 Percent Polyethylene Solution in Odorless Mineral Spirits With Increasing Ethylene Pressure*

[Temperature = 250° C.]

| Ethylene, p.s.i.g. | Viscosity, poises |
|---|---|
| 0 | 20.0 |
| 250 | 6.5 |
| 500 | 4.3 |
| 750 | 2.9 |
| 1000 | <1.0 |

The filtration process of our invention is conducted under a partial pressure of a gas that is soluble in either the polymer solution or the molten polymer, and the partial pressure is sufficient to effect a substantial reduction in the viscosity of the polymer solution or molten polymer. Any gas that is soluble in the molten polymer or polymer solution can be employed. It is preferable, however, to employ those gases that have a comparatively high solubility in the polymer solution or molten polymer. For example, to decrease the viscosity of a solution of polyethylene in liquid hydrocarbon solvent it is preferred to use a gaseous hydrocarbon, such as ethylene, ethane, propylene, propane, n-butane, isobutane, the butenes and the like. Similarly, to decrease the viscosity of solutions of solid propylene in a liquid hydrocarbon solvent, it is preferred to use one or more of these gaseous hydrocarbons. Less soluble gases, such as nitrogen, hydrogen, methane and the like, can be employed to effect a reduction in the viscosity of the polymer solution or molten polymer, but with the less soluble gases, the decrease in viscosity with increasing gas pressure is considerably less than the viscosity decrease that is realized with the more soluble gases.

Our filtration process is carried out at a temperature varying from ambient temperature to 300° C. and the temperature that is employed is high enough to maintain the polymer in solution or in the molten state. For practical purposes, the filtration process is carried out at a temperature in the range of 150–250° C. In this temperature range, it is possible to filter highly concentrated solutions of polymer and molten polymer. In general, we prefer to process polymer solutions in liquid hydrocarbons having a concentration in the range of 20 to 50% by weight. There is little economic advantage to be realized by processing solutions having a higher concentration, but, if desired, solutions of higher concentration and even molten polymer can be employed in our process. The preferred concentration of polymer that is employed varies with the molecular weight of the polymer, and, in general, the higher the molecular weight of the solution, the lower the preferred solution concentration. However, with the higher molecular weight polymers or those having a relatively low melt index it is possible to employ higher temperatures for filtration and higher partial pressures of dissolved gas in order to carry out the filtration in an efficient and expeditious manner.

When a solution of polymer is employed in our process, it is preferred to employ a liquid hydrocarbon as the solvent for the polymer. The polymerization reaction can be conducted in a solvent medium and the solvents that can be used for the polymerization reaction are well known. We prefer to employ a solution of polymer in a solvent that is the same as the solvent that is employed for the polymerization reaction. Among the solvents that can be used are hexane, heptane, octane, decane, dodecane, benzene, toluene, the xylenes, cyclohexane, decalin, tetralin, mineral spirits, and other similar aliphatic, cyclo-aliphatic and aromatic hydrocarbons.

For the most efficient operation of our filtration process, it is important to have a discharge pressure from the filter unit at least equal to and preferably higher than the partial pressure of dissolved gas in the solution or molten polymer being filtered. The desired discharge pressure can be realized by either of two illustrative procedures. In one method, the polymer solution or molten polymer from the polymerization reaction, which is ordinarily operated at an elevated pressure, can enter the suction side of a pump and be fed by the pump to the filtering step at a pressure high enough to overcome the pressure drop that takes place through the filter so that the discharge pressure from the filter is at least equal to the partial pressure of dissolved gas originally employed in the polymer solution or molten polymer. An alternate method that can be used and which does not require the use of a pump involves adding additional hydrocarbon solvent to the polymer solution as it is removed from the polymerization reactor and before the polymer solution is filtered. In this manner, the concentration of dissolved gas in the polymer solution is reduced below the concentration required to saturate the solution, and in this manner, it is possible to compensate for the pressure difference across the filtering unit. By employing either of these procedures, it is possible to eliminate flashing of dissolved gas across the face of the filter and substantially higher rates of filtration per square foot of filter area can be realized.

Our process for removing insoluble catalyst or other impurities from high molecular weight polymers has many advantages over prior art procedures. One of the most significant advantages involves the production of a polymer containing a minimum residual ash and having flow properties considerably superior to polymers of comparable melt index as isolated by prior art washing and filtration procedures. Additionally, our process avoids the necessity of using and handling large volumes of wash liquid and it is unnecessary to convert our polymer to a finely divided form before it can be employed in our purification process. Washing of polymers for purification and catalyst removal is not a particularly effective method of purifying polymers such as high molelular weight polyhydrocarbons which are relatively impermeable to organic solvents at temperatures below the softening point of the polymer. Also, in our process we have found it possible to remove impurities from solutions containing up to 50% by weight and higher concentrations of polymer in solution. The economic advantages of our process over prior art procedures where concentrations of 2 to 3% by weight of polymer in solution were employed are quite obvious. Additionally, in our process, we are able to realize a substantially complete removal of catalyst and insoluble impurities, and, consequently, we are able to produce a polymer having superior electrical properties and demonstrating superior resistance to oxidation and weathering. Polyethylene and polypropylene purified by the practice of our invention can generally be stabilized with not more than about one-tenth of the amount of antioxidant that has been required for similar polymers isolated by prior art procedures. Polymers purified by our process generally contain less than 0.01% and usually less than 0.005% by weight of catalyst residues.

The following examples are illustrative of our invention.

EXAMPLE 1

A 500 gallon stainless steel autoclave equipped with a double turbine agitator was charged with 1120 pounds of odorless mineral spirits, 4 pounds of catalyst (10% molybdenum oxide on gamma alumina) and 225 grams of sodium. The catalyst had been reduced to an average valence of 4.42 and conditioned with odorless mineral spirits at 250° C. Sodium was dispersed on the catalyst as a high surface suspension prior to charging to the reactor.

The autoclave was heated rapidly to 262° C. at 1000 p.s.i.g. ethylene pressure, venting and pressuring as required to maintain 1000 p.s.i.g. A rapid polymerization of ethylene was obtained and the temperature was maintained at 262±1° C. by cooling. At the end of fifteen hours the polymer concentration was 37.8%. Reaction rate was 10.1 pounds per pound of catalyst per hour.

The 1000 p.s.i.g. ethylene pressure on the reactor was used to force the 37.8% polymer solution through two stages of filtration in a heated plate and frame filter press with seven plates being used in the first section and three plates in the second section. The filter plates were hollow frames containing a 4 mesh back up screen, ⅛ inch diameter wire, covered with a 10 mesh screen, 1/16 inch diameter wire. Each of the filter leaves in the first section was covered with a double layer of filter paper and each filter leaf in the second section with a triple layer of the same paper. Before starting the filtration, the filter was heated to 200–220° C. with hot oil and flushed with odorless mineral spirits.

The polymer solution from the autoclave containing catalyst and polymer was passed through a jacketed pipe and cooled to 220–230° C. The solution was then admitted to the press and each stage of the filtration was brought up to pressure in succession. The back pressure on the press was maintained with an air-operated valve. Keeping this back pressure on the system held the ethylene in solution and thereby reduced the viscosity of the polymer solution by a factor of twenty at 1000 p.s.i.g. of ethylene. The pressure drop across the entire filter system ranged from 80 p.s.i.g. at the beginning to 150 p.s.i. at the end of the filtration. Total filtration time was four hours.

The polymer solution passed through the air-operated valve and was flashed to a concentrator at substantially atmospheric pressure where solvent remaining with polymer was removed. Molten polymer was then pumped from the concentrator through a cutter head and pelleted. Six hundred seventy-eight pounds of polyethylene pellets were obtained. Color=1–2; ash, weight percent 0.001; melt index 1.32; and melt stability index 0.03.

EXAMPLE 2

An 80 gallon stainless steel autoclave with a single turbine agitator was charged with 40 gallons of odorless mineral spirits and 40 grams of catalyst complex formed by reacting 10 grams of lithium aluminum hydride and 30 grams of titanium trichloride. The catalyst complex was formed by triturating the components at 90° C. for 1 hour and then elutriating to remove unreacted components.

The autoclave was pressured to 400 p.s.i.g. with propylene at 150° C. A rapid polymerization started and the reaction temperature was held at 150° C. by cooling. The polymerization was continued for 8 hours and the polypropylene concentration in the reactor reached 20.7% by weight. The autoclave was heated rapidly to 210° C. at 400 p.s.i. and discharged through 10 plates of a 6″ x 6″ stainless steel plate and frame filter press. Each plate was covered with a sandwich comprised of glass paper between two pieces of glass cloth. The pressure drop through the filter was 30–50 p.s.i.g. After the filter the molten polymer solution was let down to atmospheric pressure in a concentrator and the solvent was removed.

Twenty-eight grams of BHT (di-tertiary butyl hydroxytoluene) antioxidant was added to the molten polypropylene in the concentrator. The polymer was then pelleted, and sixty-two pounds of propylene was obtained. Properties: I.V.=1.612; melt index 2.02; melt stability index 0.02; and color 2.

EXAMPLE 3

Fifty pounds of 10 percent chromium trioxide on silica alumina (90–10) catalyst was thermally reduced by heating at 650° C. in a gas-fired ball mill while passing through a mixture containing 95 parts by volume of air and 5 parts by volume of steam. The catalyst was cooled in a stream of dry air and then slurried in cyclohexane. The average valence of the catalyst was 3.15.

Five pounds of the above catalyst in 1120 pounds of cyclohexane was charged to a 500 gallon stainless steel autoclave equipped with a double turbine agitator. The autoclave was heated rapidly to 180° C. at 2000 p.s.i.g. ethylene pressure. The polymerization temperature was maintained at 180±1° C. by heating and cooling as required. At the end of 18 hours the polymer concentration was 29.6 percent by weight and the reaction rate was 5.25 pounds per pound of catalyst per hour. The 2000 p.s.i.g. ethylene pressure on the reactor was used to force the 29.6 percent polymer solution through two stages of filtration in a 26" x 26" plate frame filter press. The press was assembled and dressed as in Example 1 above. The autoclave solution containing catalyst and polymer was passed through a jacketed pipe and heated from the 180° reaction temperature to 220–230° C. and then admitted to the press. The pressure drop across the entire system ranged from 25 p.s.i. at the beginning to 40 p.s.i. at the end of filtration. Total filtration time was 3.5 hours.

The polymer solution passed through an air-operated valve and was flashed to a concentrator. Residual solvent was removed, condensed and recycled to the solvent recovery system. Molten polymer was then pumped from the concentrator. Four hundred seventy-two pounds of polyethylene pellets were obtained. Color=1; ash; wt. percent, less than 0.003; melt index, 2.04; melt stability index, 0.02.

EXAMPLE 4

An 80 gallon stainless steel autoclave with a single turbine agitator was charged with 30 gallons of n-decane and 70 grams of a catalyst complex formed by reacting 10 grams of lithium aluminum hydride and 30 grams of titanium trichloride. The catalyst complex was formed by triturating the components at 60° C. for one hour and then elutriating to remove soluble and unreacted components. The autoclave was pressured to 600 p.s.i.g. with propylene at 150° C. A rapid polymerization started and the reaction temperature was held at 140° C. by cooling. Polymerization was continued for six hours and the polypropylene concentration in the reactor reached 18.4 percent by weight. The autoclave was discharged to a stirred hold-tank from which the propylene was vented and the polymer solution was then pressured to 2000 p.s.i. with ethane at 230° C. The solution was then admitted to a filter press at full ethane pressure. The press was a 10" x 10" ten-plate plate and frame press with a working pressure of 3500 p.s.i.g. Back pressure on the press was maintained with an air-operated valve. Keeping the back pressure on the press held the ethane in solution and reduced the viscosity of the polypropylene solution from 33 poises at 230° C., in the absence of the ethane, to less than 1 poise at 230° C. in the presence of 2000 p.s.i.g. partial pressure of ethane. Pressure drop across the entire pass ranged from 30 p.s.i. at the beginning to 80 p.s.i. at the end of the filtration. Total filtration time was 46 minutes. Polypropylene solution passed through the air-operated valve to a concentrator and the n-decane was flashed off. Approximately 0.1 percent BHT was added to the molten polymer and it was then extruded through a cutter head and pelleted. The yield of polypropylene pellets was 43 pounds. Color=1–2; ash, wt. percent, less than 0.005; melt index, 1.45; melt stability index, 0.02.

EXAMPLE 5

An 80 gallon stainless steel autoclave with a single turbine agitator was charged with 220 pounds of mineral spirits, 445 grams of a 10 percent molybdenum oxide on alumina catalyst, average valence 4.32, and 96 grams of sodium. The reactor was heated rapidly to 255° C. at 450 pounds' pressure of ethylene. At the end of 15 hours of reaction time the polymer concentration had reached 31 percent by weight. The autoclave pressure was increased to 1000 p.s.i.g. with ethylene and the autoclave contents were discharged. Immediately before the 6" x 6" stainless steel plate and frame filter press the polymer solution from the autoclave was mixed in a volume ratio of 2 to 1 with mineral spirits heated to 250° C. The plate and frame press was dressed with a sandwich comprised of glass paper between two pieces of glass cloth. The pressure drop through the filter was 15–20 p.s.i.g. Total filtration time was 22 minutes and after the filter the molten polymer solution was let down to atmospheric pressure to a concentrator where the solvent and ethylene were flashed off at 220° C. Fifty grams of BHT antioxidant was added to the molten polyethylene in the concentrator and the polymer was then pelleted by pumping through a cutter head. Ninety-five pounds of polyethylene was obtained. Properties: I.V.=1.83; melt index 1.80; melt stability index 0.05; color 2. The rate of filtration was approximately 120 pounds per square foot of filter area per hour.

EXAMPLE 6

The 500 gallon stainless steel autoclave described in Example 1 was charged with 1120 pounds of odorless mineral spirits, and with 125 grams of a catalyst complex formed by reacting 25 grams of lithium aluminum hydride and 100 grams of titanium trichloride. The catalyst complex had been prepared by first stirring the mixture vigorously in 200 cc. of mineral spirits at 90° C. for one hour and then elutriating to remove any uncomplexed components.

The autoclave was heated rapidly to 195° C. at 1000 p.s.i.g. ethylene pressure, then pressuring as required to maintain the 1000 p.s.i.g. A rapid polymerization of ethylene was initiated and the temperature was maintained at 190±2° C. by cooling in the jacket walls and by refluxing a portion of the reaction solvent. At the end of four hours the polymer concentration was 42.1 percent by weight. Reaction rate was 710 pounds of polyethylene per pound of catalyst per hour.

The autoclave contents were discharged at 1000 p.s.i.g. ethylene pressure to the suction side of a pump and following discharge from the pump the contents were heated by passing through a jacketed pipe to 230° C. The polymer solution then passed through a single stage filtration in a 10-plate, 26" x 26" heated plate and frame filter press. The back pressure on the press discharge was maintained ta 1050±50 p.s.i.g. pounds pressure with an air-operated valve. Each of the filter leaves in the press was covered with a double layer of filter paper and the filter press had an effective filtration area of approximatley 73 sq. ft. The pressure drop across the filter was less than 100 p.s.i.g. and the filtration time was 31 minutes. The polymer solution passed from the filter press and was flashed in a concentrator at substantially atmospheric pressure. The solvent remaining with the polymer was removed, condensed and recycled to the solvent recovery system.

The molten polymer was then pumped from the concentrator through a cutter head and pelleted, and 782 pounds of polyethylene pellets were obtained. Color=1; ash, wt. percent, less than 0.001; melt index 0.21; melt stability index −0.05.

In the above examples the color of the polymer was determined by comparison of the product with a standardized color scale wherein the color indexes vary from 0 to 8 with 0 indicating the best color and 8 indicating the poorest color.

The invention has been described in detail with particular reference to certain preferred embodiments thereof, but it will be understood that variations and modifications can be effected within the spirit and scope of the invention as described hereinabove and as defined in the appended claims.

We claim:
1. The method for removing solid impurities from a high molecular weight macromolecular substance which comprises filtering liquified macromolecular substance having a substantially high viscosity at which filtration is difficult, at a temperature at which said impurities are solid and under a sufficient partial pressure of a gas soluble in said liquified macromolecular substance to reduce substantially the viscosity of said liquified macromolecular substance.

2. The method for removing solid impurities from a high molecular weight polyhydrocarbon which comprises filtering a solution of said polyhydrocarbon having a concentration of said polyhydrocarbon sufficient to raise the viscosity of said solution substantially, at a temperature at which said impurities are solid and under a sufficient partial pressure of a hydrocarbon gas soluble in said polyhydrocarbon solution to reduce substantially the viscosity of said polyhydrocarbon solution.

3. The method for removing solid catalyst from high molecular weight polyhydrocarbon which comprises filtering a 20 to 50 percent by weight solution of polyhydrocarbon in a normally liquid hydrocarbon solvent at a temperature at which said catalyst is insoluble in said solvent and within the range of 150–250° C. and under a partial pressure of 100–5000 p.s.i. of a hydrocarbon gas soluble in said polyhydrocarbon solution, said pressure being sufficient to reduce substantially the viscosity of said polyhydrocarbon solution.

4. The improved process for producing a high molecular weight polyhydrocarbon which comprises polymerizing α-monoolefinic hydrocarbon in a normally liquid hydrocarbon solvent with a hydrocarbon polymerization catalyst substantially completely insoluble in said hydrocarbon solvent to form a reaction mixture containing from 20 to 50 percent by weight of high molecular weight polyhydrocarbon, and filtering said reaction mixture at a temperature at which said catalyst is insoluble in said solvent and within the range of 150–250° C. and under a partial pressure of 100–5000 p.s.i. of a hydrocarbon gas soluble in said reaction mixture, said pressure being sufficient to reduce substantially the viscosity of said reaction mixture, whereby said reaction mixture is substantially completely freed of polymerization catalyst.

5. The method for removing solid catalyst from high molecular weight polyethylene, said polyethylene having been formed in a liquid hydrocarbon solvent and in the presence of an insoluble catalyst comprising molybdenum oxide deposited on alumina and promoted wtih an alkali metal in an amount not greater than the amount retained on the surface of the metal oxide as a high surface suspension, which comprises filtering a 20–50% by weight solution of said polyethylene in said liquid hydrocarbon solvent at a temperature within the range of 150–250° C. and under a partial pressure of 100–5000 p.s.i. of ethylene in said solution of polyethylene, said pressure being sufficient to reduce substantially the viscosity of said solution of polyethylene.

6. The method for removing solid catalyst from high molecular weight polypropylene, said polypropylene having been produced in a liquid hydrocarbon solvent and in the presence of a catalyst formed by reacting lithium aluminum hydride and titanium trichloride and removing any unreacted and soluble components from said catalyst prior to use in the polymerization reaction which comprises filtering a 20 to 50% by weight solution of polypropylene in a liquid hydrocarbon solvent similar to the hydrocarbon solvent employed in the polymerization reaction at a temperature within the range of 150–250° C. and under a partial pressure of propylene, said pressure being sufficient to reduce substantially the viscosity of said polypropylene solution.

7. The method for removing solid catalyst from high molecular weight polyethylene, which comprises filtering a 20 to 50% by weight solution of polyethylene in a liquid hydrocarbon solvent at a temperature within the range of 150 to 250° C. and under a partial pressure of 100 to 5000 p.s.i. of ethylene, said pressure being sufficient to reduce substantially the viscosity of said polyethylene solution, and the discharge pressure from the filtering step being at least equal to the partial pressure of ethylene in said polyethylene solution.

8. The method for removing solid catalyst from high molecular weight polypropylene which comprises filtering a 20 to 50% by weight solution of polypropylene in a liquid hydrocarbon solvent at a temperature within the range of 150 to 250° C. and under a partial pressure of 100 to 5000 p.s.i. of propylene, said pressure being sufficient to reduce substantially the viscosity of said polypropylene solution, and the discharge pressure from the filtering step being at least equal to the partial pressure of propylene in said polypropylene solution.

References Cited in the file of this patent

UNITED STATES PATENTS

| | | |
|---|---|---|
| 1,693,417 | Wait | Nov. 27, 1928 |
| 2,728,758 | Field et al. | Dec. 27, 1955 |
| 2,886,561 | Reynolds et al. | May 12, 1959 |
| 2,969,349 | Stoller | Jan. 24, 1961 |

OTHER REFERENCES

Perry: "Chemical Engineers' Handbook," Third Edition (1950), p. 966.